United States Patent
Arefi-Sigaroodi et al.

(10) Patent No.: US 11,466,655 B2
(45) Date of Patent: Oct. 11, 2022

(54) VEHICLE PROPULSION SYSTEM

(71) Applicant: Scania CV AB, Södertälje (SE)

(72) Inventors: Mehran Arefi-Sigaroodi, Stockholm (SE); Holger Dreher, Holzgerlingen (DE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/628,357

(22) PCT Filed: Jul. 4, 2018

(86) PCT No.: PCT/SE2018/050732
§ 371 (c)(1),
(2) Date: Jan. 3, 2020

(87) PCT Pub. No.: WO2019/013689
PCT Pub. Date: Jan. 17, 2019

(65) Prior Publication Data
US 2020/0217288 A1 Jul. 9, 2020

(30) Foreign Application Priority Data
Jul. 12, 2017 (SE) .................... 1750915-9

(51) Int. Cl.
*F02N 11/04* (2006.01)
*H02P 9/04* (2006.01)
(Continued)

(52) U.S. Cl.
CPC ............... *F02N 11/04* (2013.01); *H02K 7/02* (2013.01); *H02K 7/116* (2013.01); *H02K 2201/03* (2013.01)

(58) Field of Classification Search
CPC .......... F02N 11/04; H02K 7/02; H02K 7/116; H02K 21/24; H02K 21/225
See application file for complete search history.

(56) References Cited

U.S. PATENT DOCUMENTS 4,082,971 A * 4/1978 Miyake ..................... H02K 9/22
310/114
4,309,620 A * 1/1982 Bock ......................... B60K 6/44
290/4 R
(Continued)

FOREIGN PATENT DOCUMENTS

CN 1751909 A 3/2006
CN 101689775 A 3/2010
(Continued)

OTHER PUBLICATIONS

Scania CV AB, International Application No. PCT/SE2018/050732, International Search Report, dated Sep. 5, 2018.
(Continued)

*Primary Examiner* — Tulsidas C Patel
*Assistant Examiner* — Thomas K Quigley
(74) *Attorney, Agent, or Firm* — Moore & Van Allen PLLC; W. Kevin Ransom

(57) ABSTRACT

A vehicle propulsion system comprises a combustion engine with a flywheel secured to a crank shaft of the engine. A starter motor and a generator are combined in one electric machine having a stator rigidly connected to a vehicle frame fixed part and provided with windings connected to an arrangement storing electric energy for being fed with electric energy from the arrangement in motor operation of the electric machine and feeding electric energy to the arrangement in generator operation of the electric machine and a rotor connected to the flywheel so as to make the rotor and flywheel rotating in dependence of each other. At least one of the stator and rotor has a member projecting into a recess portion of the other so as to form air gaps for magnetic flux between the rotor and the stator on both sides of the projecting member.

16 Claims, 1 Drawing Sheet

(51) Int. Cl.
  *H02K 7/02* (2006.01)
  *H02K 7/116* (2006.01)

(56) References Cited

U.S. PATENT DOCUMENTS

| | | | | | |
|---|---|---|---|---|---|
| 4,862,009 | A | * | 8/1989 | King | F02N 11/04 290/22 |
| 5,179,307 | A | * | 1/1993 | Porter | H02K 29/10 310/156.32 |
| 5,331,244 | A | * | 7/1994 | Rabe | H02K 21/12 310/180 |
| 5,773,904 | A | * | 6/1998 | Schiebold | F02N 11/04 310/92 |
| 5,814,914 | A | * | 9/1998 | Caamano | H02K 1/185 310/216.047 |
| 5,921,149 | A | * | 7/1999 | Masberg | F02B 75/06 464/180 |
| 5,939,793 | A | * | 8/1999 | Masberg | F01B 27/02 290/38 R |
| 5,977,684 | A | * | 11/1999 | Lin | H02K 21/12 310/178 |
| 6,049,197 | A | * | 4/2000 | Caamano | H02K 21/24 322/89 |
| 6,278,196 | B1 | * | 8/2001 | Ehrhart | B60K 25/02 290/40 C |
| 6,396,161 | B1 | * | 5/2002 | Crecelius | B63J 3/02 290/36 R |
| 6,459,185 | B1 | * | 10/2002 | Ehrhart | H02K 1/20 310/156.35 |
| 6,509,666 | B1 | * | 1/2003 | Huang | H02K 1/145 310/254.1 |
| 6,590,312 | B1 | | 7/2003 | Seguchi et al. | |
| 6,702,709 | B2 | * | 3/2004 | Bowen | B60L 7/14 475/277 |
| 6,787,965 | B1 | * | 9/2004 | Horng | H02K 1/145 310/156.32 |
| 6,936,933 | B2 | * | 8/2005 | Wilmore | B60K 6/383 290/46 |
| 7,114,585 | B2 | | 10/2006 | Man et al. | |
| 7,411,330 | B2 | * | 8/2008 | Kaneko | H02K 21/12 310/216.091 |
| 7,557,486 | B2 | * | 7/2009 | Choi | H02K 16/02 310/266 |
| 7,631,624 | B2 | * | 12/2009 | Pflug | F01L 1/02 123/90.16 |
| 7,646,178 | B1 | * | 1/2010 | Fradella | H02K 1/2793 322/46 |
| 8,742,641 | B2 | * | 6/2014 | Kubes | H02K 47/04 310/113 |
| 8,922,093 | B2 | * | 12/2014 | Crocker | H02K 3/28 310/268 |
| 9,425,670 | B2 | * | 8/2016 | Mariotto | H02K 7/006 |
| 9,496,757 | B2 | * | 11/2016 | Mariotto | H02K 21/24 |
| 2001/0039230 | A1 | * | 11/2001 | Severinsky | B60L 7/26 477/3 |
| 2002/0177500 | A1 | * | 11/2002 | Bowen | B60K 6/48 475/5 |
| 2003/0116118 | A1 | * | 6/2003 | Tonnqvist | F02B 67/04 123/198 R |
| 2004/0251758 | A1 | * | 12/2004 | Wilmore | B60K 6/26 310/112 |
| 2005/0104469 | A1 | * | 5/2005 | Zepp | H02K 11/21 310/191 |
| 2005/0127767 | A1 | * | 6/2005 | Gallant | H02K 7/14 310/113 |
| 2007/0194649 | A1 | * | 8/2007 | Schafer | H02K 5/1732 310/156.32 |
| 2007/0247017 | A1 | * | 10/2007 | Bumby | H02K 21/24 310/268 |
| 2007/0252472 | A1 | * | 11/2007 | Osada | H02K 7/006 310/268 |
| 2008/0072586 | A1 | * | 3/2008 | Hammond | B60K 6/405 60/330 |
| 2008/0265816 | A1 | * | 10/2008 | Takeuchi | B60L 3/0061 318/400.04 |
| 2009/0021089 | A1 | * | 1/2009 | Nashiki | H02K 21/145 310/46 |
| 2009/0066275 | A1 | * | 3/2009 | Takeuchi | H02K 41/031 318/400.01 |
| 2009/0085412 | A1 | * | 4/2009 | Takeuchi | B60L 3/0061 310/12.24 |
| 2009/0134723 | A1 | * | 5/2009 | Takeuchi | H02K 21/026 310/48 |
| 2010/0071972 | A1 | * | 3/2010 | Lamperth | B60L 7/12 180/65.51 |
| 2010/0072850 | A1 | * | 3/2010 | Miyata | H02K 21/24 310/156.12 |
| 2011/0291511 | A1 | * | 12/2011 | Crocker | H02K 1/24 310/114 |
| 2012/0013216 | A1 | * | 1/2012 | Liu | H02K 21/24 310/156.36 |
| 2013/0015667 | A1 | * | 1/2013 | Fullerton | H02K 35/02 290/1 A |
| 2013/0119789 | A1 | * | 5/2013 | Maekawa | H02K 19/103 310/46 |
| 2015/0214801 | A1 | * | 7/2015 | Libault | H02K 1/2793 310/198 |
| 2016/0099625 | A1 | * | 4/2016 | Landrum | H02K 23/54 310/59 |
| 2017/0043657 | A1 | * | 2/2017 | Schmitt | F16D 25/087 |
| 2017/0201164 | A1 | * | 7/2017 | Copeland, Jr. | H02K 21/24 |
| 2019/0013722 | A1 | * | 1/2019 | Yu | H02K 15/03 |

FOREIGN PATENT DOCUMENTS

| | | |
|---|---|---|
| CN | 102214974 A | 10/2011 |
| DE | 19941705 A1 | 3/2000 |
| EP | 1069310 A2 | 1/2001 |
| EP | 1102385 A2 | 5/2001 |
| EP | 2848835 A1 | 3/2015 |

OTHER PUBLICATIONS

Scania CV AB, International Application No. PCT/SE2018/050732, Written Opinion, dated Sep. 5, 2018.
Scania CV AB, Swedish Application No. 1750915-9, Office Action, dated Feb. 2, 2018.
Scania CV AB, International Application No. PCT/SE2018/050732, International Preliminary Report on Patentability, dated Jan. 14, 2020.
Scania CV AB, European Application No. 18832413.1, Extended European Search Report, dated Mar. 26, 2021.
Scania CV AB, Chinese Application No. 201880045139.4, First Office Action, dated Jan. 14, 2021.
Scania CV AB, Chinese Patent Application No. 201880045139.4, Second Office Action, dated Oct. 9, 2021.
Scania CV AB, Chinese Patent Application No. 201880045139.4, Third Office Action, dated Mar. 28, 2022.

* cited by examiner

VEHICLE PROPULSION SYSTEM

CROSS-REFERENCE TO RELATED APPLICATIONS

This application is a national stage application (filed under 35 § U.S.C. 371) of PCT/SE2018/050732, filed Jul. 4, 2018 of the same title, which, in turn, claims priority to Swedish Application No. 1750915-9 filed Jul. 12, 2017; the contents of each of which are hereby incorporated by reference.

FIELD OF THE INVENTION

The present invention relates a vehicle propulsion system comprising a combustion engine with a flywheel secured to a crank shaft of the engine, a starter motor controllable to start the combustion engine, and an electrical system comprising an arrangement storing electric energy and to which the starter motor is connected to be fed thereby as well as a generator configured to generate electric energy to be delivered to said arrangement and electric equipment of the vehicle.

BACKGROUND OF THE INVENTION

The invention is directed to such a propulsion system for all types of motor vehicles, although it is particularly directed to wheeled heavy motor vehicles, such as trucks and buses. The invention will for that sake hereinafter mainly be discussed for heavy trucks and buses so as to illuminate the invention but accordingly not restrict the invention thereto.

When constructing especially these types of motor vehicles there has been and is an ongoing attempt to make components smaller and less space demanding which has led to propulsion systems with small sizes of starter motors and generators and this has resulted in an increased current-weight ratio. The consequences thereof may be a reduced quality and a higher risk for very high temperatures and fire hazard. In spite of the smaller size of the starter motor and the generators they do together need a considerable space since the generator has to be run by a separate belt.

U.S. Pat. No. 6,278,196 B1 discloses a vehicle propulsion system of the type defined in the introduction in which the starter motor and the generator are combined in one electric machine resulting in saving of weight and space.

SUMMARY OF THE INVENTION

The object of the present invention is to provide a vehicle propulsion system of the type known through the publication mentioned above being improved in at least some aspect with respect to such known vehicle propulsion systems.

The construction of the electric machine thereof, which has a stator rigidly connected to a vehicle frame fixed part and provided with windings connected to the arrangement for being fed with electric energy from the arrangement in motor operation of the electric machine and feeding electric energy to the arrangement in generator operation of the electric machine and a rotor connected to the flywheel so as to make the rotor and flywheel rotating independent of each other, so that at least one of the stator and the rotor has a member projecting into a recess portion of the other so as to form air gaps for magnetic flux between the rotor and the stator on both sides of said projecting member the performance of the electric machine may be increased and an electric machine for a certain transfer of power may be made more compact, and thus space be saved. Thus, each air gap creates an additional torque, so that the torque transferrable through such an electric machine will be increased by increasing the number of said air gaps. The creation of said air gaps by a member projecting into a recess portion makes the design of the electric machine even more compact.

According to an embodiment of the invention said at least one of the stator and the rotor has at least two said projecting members and the other equally many said recess portions each receiving such a projecting member. By choosing the number of such air gaps the desired magnitude of torque of the electric machine may be obtained.

According to another embodiment of the invention said projecting member is projecting in parallel with an axis of rotation of the flywheel while forming a ring concentrically arranged with respect to said axis and received in a recess portion, and the projecting member and the recess portion are circular as seen in the direction of said axis of rotation. Such a circular design of the projecting member and the recess portion makes it possible to obtain high torques transferrable between the stator and the rotor for a given size of the electric machine.

According to another embodiment of the invention said projecting member projects radially with respect to an axis of the rotation of the crank shaft into a radially directed recess portion. The projecting member may then have an outer edge concentrically surrounding the axis of rotation. This is another possible design of the projecting member and the recess portion resulting in a high possible torque for a given size of the electric machine.

According to another embodiment of the invention at least the rotor of the electric machine is received in an annular space defined by an outer surrounding axially directed part of the flywheel. Using said annular space normally present around a hub of the flywheel for separating the hub with respect to a mass of the flywheel located more distant to the axis of rotation of the flywheel for obtaining the required inertia of the flywheel to accommodate at least the rotor of the electric machine results in a compact design of the vehicle propulsion system according to the invention.

According to another embodiment of the invention the rotor is connected to the flywheel through a gear, which means that this gear may be selected for obtaining a desired relationship between the rotation speed of the flywheel and that of the rotor.

According to another embodiment of the invention the rotor is connected to the flywheel through a planetary gear. This results in the possibility to change the relationship between the rotation speed of the flywheel, i.e. of the crankshaft, and the rotor by acting on the planetary gear so as to adapt this relationship to the operation mode of the electric machine, i.e. whether it is operated as a motor or as a generator.

According to another embodiment of the invention the sun gear of a planetary gear set is secured to the flywheel and the ring gear of the planetary gear set is secured to the rotor. This constitutes a suitable way of arranging such a planetary gear, in which the sun gear may be arranged on a hub of the flywheel.

According to another embodiment of the invention the vehicle propulsion system comprises a device controllable to change the relationship between the rotation speed of the flywheel and the rotation speed of the rotor. Such a device makes it possible to change this relationship so as to be adapted to the actual operation mode of the electric machine.

According to another embodiment of the invention said device is controllable to change said relationship by acting upon the planetary gear.

According to another embodiment of the invention the rotor is provided with permanent magnets, which promotes a high possible torque for a certain size of the electric machine.

The invention also relates to a motor vehicle according to the appended claim directed to such a motor vehicle.

Further advantageous features as well as advantages of the present invention appear from the description following below.

BRIEF DESCRIPTION OF THE DRAWING

With reference to the appended drawing, below follows a specific description of embodiments of the invention cited as examples.

In the drawing.

DETAILED DESCRIPTION THE INVENTION

Figure 1:
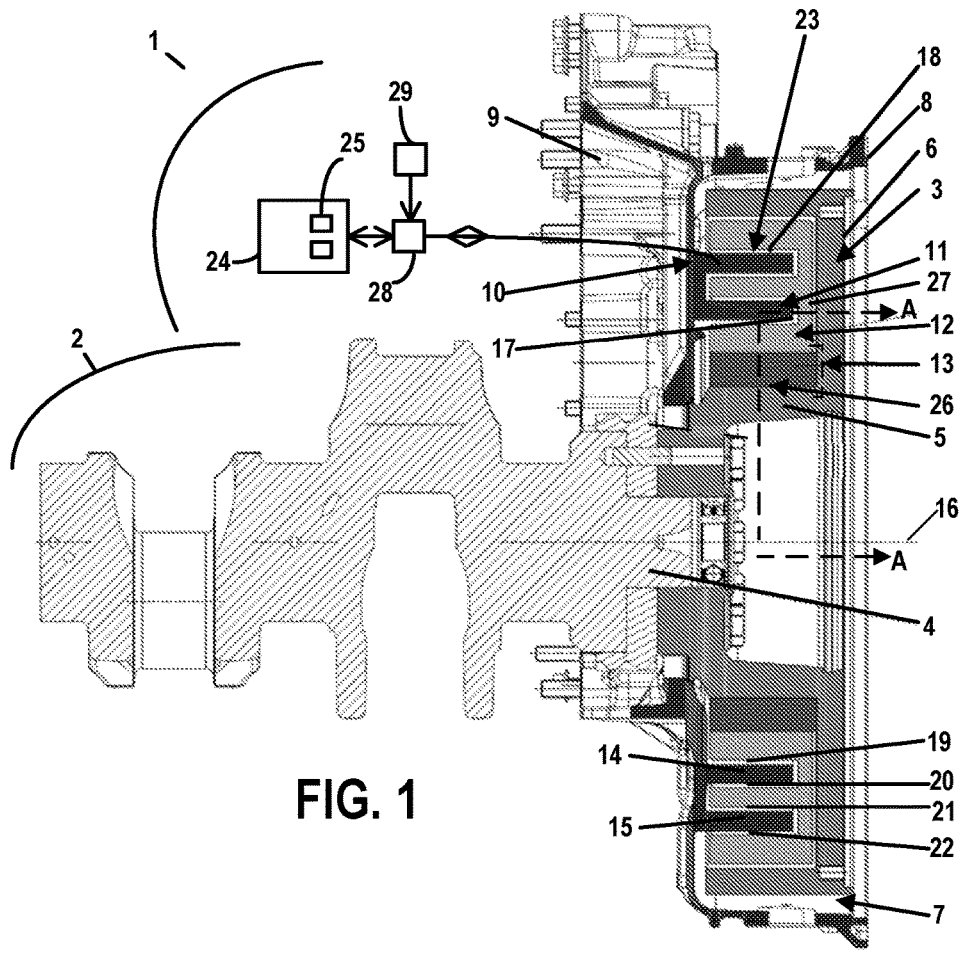
FIG. 1 is a schematic view showing a vehicle propulsion system according to a first embodiment of the invention in cross-section.

FIG. 1 illustrates schematically a part of a vehicle propulsion system arranged in a vehicle 1 and having a combustion engine 2 with a flywheel 3 secured to a crank shaft 4 of the engine. The flywheel 3 has a central hub 5 and an outer part 6.

Figure 1A:
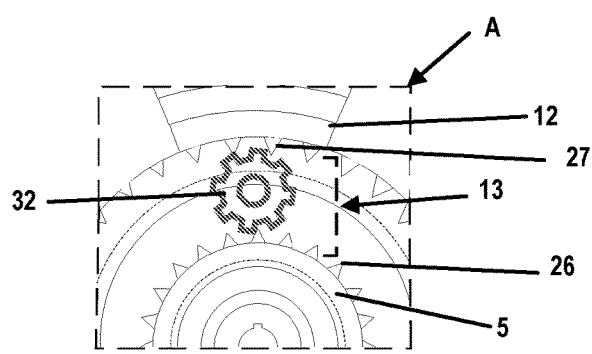
FIG. 1A is a front schematic view taken as Section A from FIG. 1 showing configuration of a planetary gear connecting the flywheel to the rotor, according to one embodiment of the present invention.

The flywheel is arranged in a casing 8 fixed to an engine block 9 fixed with respect to a frame of the vehicle. An electric machine 10 is arranged inside the casing 8 and has a stator 11 rigidly connected to the casing. A rotor 12 is connected to the flywheel 3 through a planetary gear 13, as shown in FIG. 1A. This rotor may be provided with permanent magnets in the case of a permanent magnet electric machine. However, other types of electric machines, such as a synchronous electric machine, are also possible.

The stator is provided with two projecting members 14,15 projecting in parallel with an axis of rotation 16 of the flywheel 3 while forming rings concentrically arranged with respect to this axis and received in a recess portion 17, 18 each of the rotor 12. This means that air gaps 19-22 are formed on opposite sides of the respective projecting member for magnetic flux between the rotor and the stator.

Furthermore, the stator is provided with windings 23 schematically indicated on each of the projecting members, and these windings are through an inverter 28 controlled by a control unit 29 connected to an arrangement 24 storing electric energy, such as 24V electric batteries 25.

With reference to FIG. 1A, the sun gear 26 of the planetary gear set 13 is comprised of gearing on the hub 5 of the flywheel 3 and the ring gear 27 is comprised of gearing secured to the rotor 12, where the sun gear 26 and the ring gear 27 are connected via one or more planet gears 32 of the planetary gear set 13. Thus, the electric machine will nearly completely be arranged inside said annular space 7 of the flywheel 3 and by that demand a minimum of space.

When starting the combustion engine 2 electric energy will be fed from the batteries 25 to the windings 23 of the stator 11 for driving the rotor 12 and by that the flywheel 3 to rotate while functioning as a starter motor. Once the combustion engine is running the electric machine may instead operate as a generator feeding electric energy from the stator windings to the electric batteries 25 and electric equipment of the vehicle.

The number of air gaps so formed, the number of the poles of the electric machine as well as the ratio of the planetary gear may be chosen to adapt the electric machine to the requirements of the operation thereof as starter motor and generator.

Figure 2:
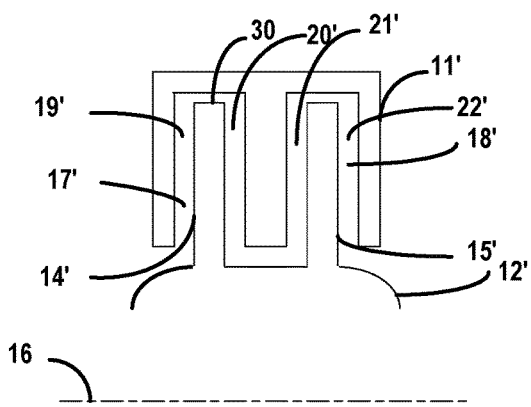
FIG. 2 is a view similar to that of FIG. 1 of a part of the rotor and the stator of an electric machine in a vehicle propulsion system according to a second embodiment of the invention.

FIG. 2 illustrates schematically the design of the rotor and the stator of the electric machine in a second embodiment of the invention, in which the rotor 12' has projecting members 14', 15' projecting radially with respect to an axis of rotation of the crankshaft into radially directed recess portions 17', 18' of the stator 11' so as to form air gaps 19'-22' axially directed for magnetic flux between the stator and rotor. The projecting members have an outer edge 30 concentrically surrounding the axis of rotation of the flywheel.

The invention is of course in no way restricted to the embodiments described above, since many possibilities for modifications thereof are likely to be obvious to one skilled in the art without having to deviate from the scope of invention defined in the appended claims.

The invention claimed is:

1. A vehicle propulsion system comprising:
a combustion engine with a flywheel secured to a crank shaft of the engine;
a starter motor controllable to start the combustion engine; and
an electrical system comprising an arrangement for storing electric energy and to which the starter motor is connected to be fed thereby as well as a generator configured to generate electric energy to be delivered to said arrangement and electric equipment of the vehicle,
wherein the starter motor and the generator are combined in one electric machine having a stator rigidly connected to a vehicle frame fixed part and provided with windings connected to said arrangement for being fed with electric energy from the arrangement in motor operation of the electric machine and feeding electric energy to the arrangement in generator operation of the electric machine and a rotor connected to the flywheel so as to make the rotor and flywheel rotate in dependence of each other,
wherein at least one of the stator or the rotor has a projecting member projecting into a recess portion of the other of the at least one stator or rotor so as to form air gaps for magnetic flux between the rotor and the stator on both sides of said projecting member,
wherein said projecting member projects in a direction laterally offset from and in parallel with an axis of rotation of the flywheel while forming a ring concentrically arranged with respect to said axis of rotation of the flywheel and received in a recess portion, and that the projecting member and the recess portion are circular as seen in a longitudinal direction of said axis of rotation of the flywheel,
wherein the rotor is connected to the flywheel through a gear set, and
wherein at least the rotor of the electric machine is received within an annular space defined by a hub of the flywheel and an outer surrounding axially directed part extending from an outer portion of the flywheel.

2. A vehicle propulsion system according to claim 1, wherein said projecting member projects radially with respect to an axis of rotation of the crank shaft into a radially directed recess portion.

3. A vehicle propulsion system according to claim 2, wherein said projecting member has an outer edge concentrically surrounding said axis of rotation of the crank shaft.

4. A vehicle propulsion system according to claim 1, wherein said at least one of the stator or the rotor has at least two said projecting members and the other of said at least one stator or rotor comprises at least two recess portions each for receiving projecting member.

5. A vehicle propulsion system according to claim 1, wherein the gear set connecting the rotor to the flywheel is a planetary gear set.

6. A vehicle propulsion system according to claim 5, wherein a sun gear of the planetary gear set is secured to the flywheel and a ring gear of the planetary gear set is secured to the rotor.

7. A vehicle propulsion system according to claim 1 further comprising a device controllable to change a relationship between a rotation speed of the flywheel and a rotation speed of the rotor.

8. A vehicle propulsion system according to claim 6 further comprising a device controllable to change a relationship between a rotation speed of the flywheel and a rotation speed of the rotor, wherein said device is controllable to change said relationship between the rotation speed of the flywheel and the rotation speed of the rotor by acting upon a planetary gear of the planetary gear set.

9. A vehicle propulsion system according to claim 1, wherein the rotor is provided with permanent magnets.

10. A motor vehicle having a propulsion system comprising:
 a combustion engine with a flywheel secured to a crank shaft of the engine;
 a starter motor controllable to start the combustion engine; and
 an electrical system comprising an arrangement for storing electric energy and to which the starter motor is connected to be fed thereby as well as a generator configured to generate electric energy to be delivered to said arrangement and electric equipment of the vehicle,
 wherein the starter motor and the generator are combined in one electric machine having a stator rigidly connected to a vehicle frame fixed part and provided with windings connected to said arrangement for being fed with electric energy from the arrangement in motor operation of the electric machine and feeding electric energy to the arrangement in generator operation of the electric machine and a rotor connected to the flywheel so as to make the rotor and flywheel rotate in dependence of each other,
 wherein at least one of the stator or the rotor has a projecting member projecting into a recess portion of the other so as to form air gaps for magnetic flux between the rotor and the stator on both sides of said projecting member,
 wherein said projecting member projects in a direction laterally offset from and in parallel with an axis of rotation of the flywheel while forming a ring concentrically arranged with respect to said axis of rotation of the flywheel and received in a recess portion, and that the projecting member and the recess portion are circular as seen in a longitudinal direction of said axis of rotation of the flywheel,
 wherein the rotor is connected to the flywheel through a gear set, and
 wherein at least the rotor of the electric machine is received within an annular space defined by a hub of the flywheel and an outer surrounding axially directed part extending from an outer portion of the flywheel.

11. A motor vehicle according to claim 10, wherein said projecting member projects radially with respect to an axis of rotation of the crank shaft into a radially directed recess portion.

12. A motor vehicle according to claim 11, wherein said projecting member has an outer edge concentrically surrounding said axis of rotation of the crank shaft.

13. A motor vehicle according to claim 10, wherein said at least one of the stator or the rotor has at least two said projecting members and the other of said at least one stator or rotor comprises at least two recess portions each for receiving a projecting member.

14. A motor vehicle according to claim 10, wherein the gear set connecting the rotor to the flywheel is through a planetary gear set.

15. A vehicle propulsion system comprising:
 a combustion engine with a flywheel secured to a crank shaft of the engine;
 a starter motor controllable to start the combustion engine; and
 an electrical system comprising an arrangement for storing electric energy and to which the starter motor is connected to be fed thereby as well as a generator configured to generate electric energy to be delivered to said arrangement and electric equipment of the vehicle,
 wherein the starter motor and the generator are combined in one electric machine having a stator rigidly connected to a vehicle frame fixed part and provided with windings connected to said arrangement for being fed with electric energy from the arrangement in motor operation of the electric machine and feeding electric energy to the arrangement in generator operation of the electric machine and a rotor connected to the flywheel so as to make the rotor and flywheel rotate in dependence of each other,
 wherein at least one of the stator or the rotor has a projecting member projecting into a recess portion of the other of the at least one stator or rotor so as to form air gaps for magnetic flux between the rotor and the stator on both sides of said projecting member,
 wherein said projecting member projects in a direction laterally offset from and in parallel with an axis of rotation of the flywheel while forming a ring concentrically arranged with respect to said axis of rotation of the flywheel and received in a recess portion, and that the projecting member and the recess portion are circular as seen in a longitudinal direction of said axis of rotation of the flywheel, and
 wherein the rotor is connected to the flywheel through a planetary gear set, wherein a sun gear of the planetary gear set is secured to the flywheel and a ring gear of the planetary gear set is secured to the rotor.

16. A motor vehicle comprising the vehicle propulsion system according to claim 15.

* * * * *